United States Patent [19]

Chambers et al.

[11] 4,224,080

[45] Sep. 23, 1980

[54] METHOD OF TREATING INORGANIC OXIDE PIGMENTS

[75] Inventors: Hubert H. Chambers, Waltham; Brian J. Tear, Grimsby, both of England

[73] Assignee: Laporte Industries Ltd., Bedfordshire, England

[21] Appl. No.: 949,877

[22] Filed: Oct. 10, 1978

Related U.S. Application Data

[63] Continuation of Ser. No. 816,263, Jul. 18, 1977, abandoned.

[30] Foreign Application Priority Data

Jul. 28, 1976 [GB] United Kingdom ............... 31503/76

[51] Int. Cl.$^2$ ............................................. C09C 1/36
[52] U.S. Cl. ............................ 106/308 Q; 106/300; 106/308 N; 252/356
[58] Field of Search ............... 106/300, 308 N, 308 Q; 252/356, 363.5

[56] References Cited

U.S. PATENT DOCUMENTS

| | | | |
|---|---|---|---|
| Re. 21,322 | 1/1940 | Harris | 252/356 X |
| 3,542,575 | 11/1970 | Nelson | 106/308 Q |
| 3,728,142 | 4/1973 | Rudolph et al. | 106/308 Q X |
| 3,825,438 | 7/1974 | Pritchard et al. | 106/300 X |
| 3,957,526 | 5/1976 | Hodgkin et al. | 106/300 |

FOREIGN PATENT DOCUMENTS

| | | | |
|---|---|---|---|
| 224322 | 3/1958 | Australia | 106/308 B |
| 1277565 | 6/1972 | United Kingdom | 106/30 |
| 1427210 | 3/1976 | United Kingdom | 106/300 |

*Primary Examiner*—G. O. Peters
*Attorney, Agent, or Firm*—Kane, Dalsimer, Kane, Sullivan and Kurucz

[57] ABSTRACT

Inorganic oxides pigments, coated with alumina are treated with water soluble hydroxy acids or salts for example sodium citrate, and with water soluble di- or polyhydric alcohols, for example pentaerythritol, or with a water soluble reaction product of excess di- or polybasic organic hydroxy acids with di- or polyhydric alcohol. Titanium dioxide pigment so treated may be used in both emulsion paint and in organic based paint systems.

12 Claims, No Drawings

METHOD OF TREATING INORGANIC OXIDE PIGMENTS

This is a continuation of application Ser. No. 816,263, filed July 18, 1977 now abandoned.

BACKGROUND OF THE INVENTION

1. Field of the Invention

This invention relates to inorganic oxide pigments and to a process for treating them to render them suitable for incorporation in paints or in other surface coating media.

2. Brief Description of the Prior Art

Different types of surface coating media present different pigment suitability requirements and, within limits, it is possible to tailor a pigment for a particular medium by surface coating the particles of the pigment with one or more inorganic oxides by, for example, precipitating the inorganic oxide onto the surface of the pigment. An improvement in one pigment property attained by the use of a particular combination of inorganic oxides in the surface coatings, or by a particular method of incorporating the inorganic oxide coating on the pigment, is often accompanied by a deterioration in other pigment properties. The water-dispersibility of a pigment which is a critically important criterion of suitability of a pigment intended for use in aqueous emulsion paints, depends on the isoelectric point of the pigment, that is, the pH at which the charge of the pigment particle is zero. For use in aqueous emulsion paints the pigment particles should give a slurry having as high a negative charge as possible and as high a pH as possible consistent with the limitation that at a pH above 10.5 any alumina present may dissolve. The lower the isoelectric point of the pigment the higher the negative charge of the slurry at a given alkaline pH. The isoelectric point, being a surface property of the pigment particles, may be controlled by surface coating the pigment particles with metal oxides. An alumina coating gives an isoelectric point at a pH of 9.2 and a titania coating gives an isoelectric point at a pH of 4.2 and a homogeneous mixed alumina/titania coating gives an isoelectric point at an intermediate pH depending on the proportion of alumina to titania. A substantial proportion of titania in a pigment surface coating can therefore improve dispersibility although this is accompanied by a deterioration in the case with which the pigment particles may be filtered and washed. This may be improved by increasing the proportion of alumina in the surface coating at the expense of decreased water dispersibility. A proportion of silica in the surface coating can also improve water dispersibility as can the use of a higher pH during precipitation of the inorganic oxide surface coating. Other examples of the problem of attaining a suitable combination of properties to render the pigment suitable for use in a paint medium are well known in the art and much effort has been expended in alleviating them.

It is now possible to obtain grades of pigment which perform adequately in a variety of different aqueous emulsion paints or in a variety of different organic-based paints. The problem of attaining a grade of pigment which performs adequately in both aqueous and organic media, the so-called "universal" pigment, is still with us and although several such grades are on the market none fully satisfies all the requirements for use in both types of medium.

Two fundamentally important properties of organic based paints are gloss and durability. Durability is, generally, improved by increasing the proportion of alumina in the inorganic oxide surface coating but with the previously discussed attendant deterioration in water dispersibility. The gloss properties of organic based paints can be impaired by increasing the relative proportion of silica in the inorganic oxide surface coating.

SUMMARY OF THE INVENTION

The present invention relates to new or improved "universal" grades of inorganic oxide pigment and to a method for preparing them.

The present invention provides a method for treating inorganic oxide pigment particles bearing a surface coating comprising alumina, comprising treating the coated pigment particles with one or more water soluble organic hydroxy acids or water soluble salts of such acids and one or more water soluble di- or polyhydric alcohols, or with a water soluble reaction product of one or more di- or polybasic organic hydroxy acids with one or more di- or polyhydric alcohols the said reaction product containing unesterified carboxyl groups, the coated pigment particles being in contact during treatment with an aqueous solution of the said acid or salt or of the said reaction product.

According to one aspect of the present invention the inorganic oxide pigment is titanium dioxide. The titanium dioxide may be in either rutile or anatase crystallographic form and may be in the form of a composite pigment with an extender such as silica or alumina. The invention will be particularly described, hereafter, with reference to titanium dioxide pigment but without any limitation of the scope of the invention thereto.

DETAILED DESCRIPTION OF THE PREFERRED EMBODIMENTS OF THE INVENTION

Subject to the essential inclusion therein of alumina the titanium dioxide to be treated may have a surface coating of any of a wide variety of inorganic oxides known for this purpose. The term oxide is used with reference to a surface coating herein to include hydrous oxides and hydroxides since such may be formed by precipitation techniques. Suitable inorganic oxides apart from that of aluminium, may be selected from those of antimony, beryllium, cerium, hafnium, lead, niobium, silicon, tantalum, tin, titanium, zinc and zirconium. Preferably there is included with the alumina in the surface coating one or more oxides having an isoelectric point at a pH below 7.0. Examples of such oxides are those of cerium, antimony, silicon, titanium, zirconium and tin. Very suitably the titanium dioxide particles to be treated have incorporated with them a surface coating composed of alumina and one or both of titania and silica. The proportion of alumina to other oxides preferably corresponds to an atomic ratio of aluminium to other elements of at least 1:1 and desirably from 1:1 to 3:2.

Since a function of the inorganic oxide surface coating is to provide modified surface properties it is desirable to ensure that the theoretically desired combination of oxides is present in the surface layer of the surface coating. Suitably therefore, if one or more oxides of elements other than aluminium are used they are coprecipitated with the alumina from a solution also containing suitable elements of the other compounds to form at least the surface layer of the surface coating.

Alkaline precipitation conditions tend to increase water dispersibility and are therefore preferably used. The surface coating may be applied to the titanium dioxide particles by any suitable precipitation technique such as by forming a mixed solution containing compounds precipitatable under alkaline conditions as oxides, hydroxides or hydrous oxides, forming a slurry of the titanium dioxide particles in the solution and effecting the precipitation onto the titanium dioxide particles. Aluminium sulphate is a suitable compound from a solution of which alumina may be precipitated by the addition of alkali. Titanium tetrachloride is a suitable titanium compound from a solution of which titania may be precipitated by hydrolysis under alkaline conditions. Sodium silicate is a suitable silicon compound.

Preferably the surface coating is formed by precipitation at a pH above 7 and preferably at a pH of up to 9.

The total weight of the surface coating thus formed is preferably from 0.1% to 15% and particularly preferably 0.5% to 10% based on the dry weight of the coated pigment. Preferably the surface coating comprises 0.5% to 5% of alumina based on the dried weight of the coated pigment.

The one or more hydroxy acids used to treat the surface coated titanium dioxide particles are preferably brought into contact with the coated particles in the form of an aqueous solution of suitable salts thereof although they may be mixed with the particles as a solid provided they are dissolved in water, to form the aqueous solution, thereafter. Without being limited to the operation of the following theory we believe that there is some form of interaction between the hydroxy acid anion and the postively charged aluminium sites on the surface coating and that this interaction may also involve ancilliary bonding by the hydroxyl groups. Preferably, therefore, the hydroxy acid is as fully dissociated, during the treatment as possible. Preferably therefore the aqueous solution of the one or more hydroxy acids or salts has at least the pH at which the particular hydroxy acids or salts used are fully dissociated.

The method used to treat the surface coated titanium dioxide pigment with the solution of one or more hydroxy acids or salts is dependent on the stage in the production of the titanium pigment at which the treatment is carried out.

The titanium dioxide, before the surface coating comprising alumina has been applied, will usually have been recovered from processing steps involving a water phase, such as a hydroclassification step, washed, milled and optionally dried. The surface coating is then usually precipitated onto this base pigment as above described in one or more precipitation stages and the resulting slurry of coated pigment dewatered as by filtering, washed to remove dissolved salts and dewatered again. The dewatered filter cake is usually dried in an oven at a temperature of for example from 100° C. to 200° C. and then broken up and milled. Alternatively spray drying may be employed since this improves the handling characteristics of the pigment and reduces the problems associated with filtration. The final milling is usually performed in a fluid energy mill such as a Micronizer (Trade Mark).

Suitably a solution of the one or more hydroxy acids or salts is added to the slurry of titanium dioxide resulting after the precipitation of the surface coating, or to a wet filter cake resulting from the recovery and/or washing of the surface coated titanium dioxide, or to a slurry of the surface coated titanium dioxide formed from the said filter cake. We do not exclude the possibility of adding the solution to the surface coated titanium dioxide after drying although, since this would involve wetting the titanium dioxide, it would be wasteful of energy. Alternatively one or more hydroxy acids or salts may be dissolved directly in a slurry of the titanium dioxide pigment.

Preferably the concentration of the one or more hydroxy acids or salts in the aqueous solution with which the treated pigment particles are in contact during treatment is from 0.5% to 5.0% by weight and the one or more hydroxy acids or salts are preferably present in from 0.1% to 1.0% and particularly preferably from 0.1% to 0.5% by weight of the surface coated titanium dioxide being treated. The one or more hydroxy acids or salts are preferably mono- di- or tri-basic carboxylic acids or salts and particularly preferably are di- or tri-carboxylic acids or salts. Since the presence of unsaturation may result in long term chemical instability in the surface coating we prefer to use hydroxy acids saturated with respect to chemical bonding. Preferably the hydroxy acid is based on a carbon chain of from 3 to 6 carbon atoms. Examples of suitable di- and polycarboxylic acids are tartaric and citric acids which may be used, for example, in the form of their sodium or potassium salts.

The one or more di- or polyhydric alcohols which are used in the practice of this invention preferably contain at least three and particularly preferably at least 4 hydroxyl groups although the dihydric alcohols such as ethylene glycol may be used and are considered herein to be within the scope of the invention. Very suitably the one or more di- or polyhydric alcohols contain from 4 to 6 hydroxyl groups inclusive. For the reason stated above in relation to hydroxy acids the di- or polyhydric alcohols are preferably saturated with respect to chemical bonding. Particularly preferably the one or more di- or polyhydric alcohols contain no functional groups other than hydroxyl groups. The preferred polyhydric alcohol is pentaerythritol.

The one or more polyhydric alcohols may be brought into contact with the coated pigment particles after treatment with the one or more di- or polybasic hydroxy acids and drying, for example by dry mixing in the fluid energy milling stage, but are preferably added as an aqueous solution either at the same time as the addition of the hydroxy acid solution, or subsequently, but before fluid energy milling. The preference for the use of an aqueous solution of the polyol may be due to the possibility of polyester formation, to a degree at least, "in situ" on the surface of the coated pigment particles. The polyol is preferably used in from 0.1% to 5.0% and particularly preferably from 0.1% to 1.0% for example in from 0.2% to 0.8%, by weight of the surface coated titanium dioxide being treated.

According to one aspect of the present invention the coated pigment particles are treated with the reaction product of one or more di- or polyhydric alcohols with one or more di- or polycarboxylic hydroxy acids. If a di- or polycarboxylic hyroxy acid and di- or polyhydric alcohol are mixed and heated ester linkages are formed and a solid water soluble polyester reaction product forms. Such a product may be utilised in the practice of this invention. It is essential that the product contains free unesterified carboxyl groups. This may be ensured by reacting the alcohol with an excess of the acid and monitoring by titrating the product with sodium hydroxide. The product may be used in the free acid form or in a partially or completely neutralised salt form. Suitably the one or more di- or polybasic hydroxy acids and the one or more di- or polyhydric alcohols used to form the reaction product are as preferred for treating the pigment as described above.

The treated pigment is suitably water washed, dried and fluid energy milled to obtain the final product ready for incorporation in paint or other surface coating media.

The invention will now be illustrated by means of the following examples. In these examples the properties of the pigment according to the invention and of comparative pigments, were measured by the following techniques:

(1) Performance in aqueous systems.

Dispersibility (a) Dispersant demand.

100 g of pigment is dispersed in 80 mls of water containing 0.5 g of a soluble cellulose derivative available under the Trade Mark "Natrasol" and the viscosity of the dispersion is measured in poises by standard means. The dispersion is then titrated stepwise with a solution of a dispersant which is a sodium polyacrylate available under the Trade Mark "Orotan" and the viscosity is measured after each titration step. The dispersant demand is the amount of dispersant necessary to reduce the viscosity of the dispersion to a final steady minimum value and is expressed by a three number sequence expressing in order the initial viscosity in poises, the weight percent of the dispersant with reference to the dry weight of the pigment and the final viscosity in poises. A good pigment will give a low initial viscosity and require a low quantity of dispersant to attain the limiting value.

(b) Emulsion paint stability.

The pigment is incorporated into a standard vinyl silk emulsion paint formulation. The viscosity in poises, is measured initially and after accelerated ageing at a temperature of 40° C. for 4 days. A good pigment will give a low initial viscosity and an increase after accelerated ageing of 1.0 poise or less.

(2) Performance in organic systems.

Durability

The pigment is incorporated into a standard alkyd paint formulation which is formed into a film which is allowed to dry. The weight loss in mg of an area of film of 100 cm$^{-2}$ is measured after accelerated weathering in a standard carbon arc apparatus for approximately 2000 hours (actual time stated).

% Gloss

The pigment was incorporated at a pigment volume concentration of 40% into a standard acrylic resin paint formulation. A beam of light was shone at an angle of incidence of 45° onto a standard black tile, and the intensity of the reflected light, in a line passing through the point of incidence making an angle of 45° to the normal to the surface of the tile and lying in a plane containing the axis of the beam and the normal, was measured. The tile was then replaced by a glass panel to which a film of paint containing the pigment had been applied, and the intensity of the reflected light measured as before.

$$\text{The \% Gloss} = \frac{\text{Reflected intensity} - \text{paint film}}{\text{Reflected intensity} - \text{black tile}} \times 100$$

In the following Examples the inorganic oxide surface coating on the base pigment was a coprecipitate whenever one or more oxides other than aluminium are used and is identified in the Examples by inorganic element and weight % based on the dried surface coated pigment. The properties of the hydroxy acid and polyol are also stated on the same percentage basis. Examples 1-3, 6 and 10-15 are according to the invention, the remaining Examples being inserted for comparative purposes.

EXAMPLES 1-4

Titanium dioxide pigment coated by coprecipitation with 2.0% Al$_2$O$_3$ and 1.5% TiO$_2$ washed, and filtered, was treated by adding a solution of sodium citrate (6% by weight) and pentaerythritol (5% by weight) to the filter cake which contained about 45% by weight of water and the wet filter cake was then mixed, dried and fluid energy milled using air in a Micronizer (Trade Mark).

The following results were obtained:

| Example | Sodium citrate | Pentae-rythri-tol | Emulsion Paint Stability | | Isoelectric Point |
|---|---|---|---|---|---|
| | | | Initial Viscosity | Viscosity change | |
| 1 | 0.18% | 0.2% | 3.4 | +1.2 | 6.3 |
| 2 | 0.55% | 0.2% | 3.2 | +0.9 | 6.5 |
| 3 | 0.92% | 0.2% | 3.2 | +0.8 | 6.0 |
| 4 | 0% | 0.2% | 3.9 | +5.7 | 7.5 |

EXAMPLES 5-10

In Examples 5 to 8 the same alumina/titania coated titanium dioxide pigment was used as in Examples 1 to 4. Sodium citrate and pentaerythritol were added in the same manner in Examples 5 to 7, 9 and 10 as in Examples 1 to 4. As a comparison in Example 8 the hydroxy acid was mixed as a solid with the dried pigment just before fluid energy milling. The resulting pigment was incorporated in an alkyd paint medium and subjected to the durability test as described above.

In Examples 9 and 10 the pigment was titanium dioxide coated by coprecipitation with 2.0% Al$_2$O$_3$, 1.75% TiO$_2$ and respectively 1.0% and 0.8% of SiO$_2$.

| Example | Sodium Citrate | Pentaery-thritol | Durability | |
|---|---|---|---|---|
| | | | Wt loss mg/100 cm$^2$ | hrs exposed |
| 5 | — | 0.2 | 53.7 | 2026 |
| 6 | 0.55 | 0.2 | 46.8 | 2026 |
| 7 | 0.55 | — | 50.7 | 2026 |
| 8 | 0.55 | — | 54.2 | 2026 |
| 9 | — | 0.2 | 35.4 | 818 |
| | — | 0.2 | 37.8 | 1000 |
| 10 | 0.2 | 0.2 | 33.1 | 818 |
| | 0.2 | 0.2 | 35.2 | 1000 |

It was found in other experiments that no increase in durability in alkyd systems was obtained where the sodium citrate and pentaerythritol were fed into the fluid energy mill.

EXAMPLES 11-16

A titanium dioxide pigment was coated by precipitation with 2.0% $Al_2O_3$ and 1.5% $TiO_2$ and the coated pigment filtered and washed. The resulting filter cake was treated with a 6% wt solution of hydroxy acid and 5% wt solution of polyol and the treated pigment mixed and fluid energy milled in air. The aqueous dispersibility of the treated pigments and the % Gloss in an acrylic system at a concentration of 40% pigment volume concentration were measured and the results are summarised in the following table:

| Example | Hydroxy Acid | Polyol Pentaery-thritol | Dispersant Demand | % Acrylic Gloss |
|---|---|---|---|---|
| 11 | Sodium citrate 0.26% | 0.4% | 1.4/0.0/1.3 | 61 |
| 12 | Potassium citrate 0.3% | " | 2.0/0.0/1.3 | 61 |
| 13 | Sodium Tartrate 0.26% | " | 1.5/0.0/1.3 | 64 |
| 14 | Potassium Tartrate 0.32% | " | 2.0/0.0/1.3 | 63 |
| 15 | Potassium Lactate 0.36% | " | 2.4/0.03/1.3 | 68 |
| 16 | — | 0.4% | 6.5/0.11/1.1 | 59 |

This shows the excellent water dispersibility obtainable by means of the present invention in a pigment which also shows an improvement in acrylic gloss and has the improved durability obtainable by means of the invention.

What we claim is:

1. A method for producing particles of titanium dioxide pigment useful for dispersion in aqueous or organic media, which comprises; in sequence,
    precipitating onto particles of titanium dioxide an inorganic oxide surface coating comprising alumina;
    washing the inorganic oxide coated particles to remove dissolved salts;
    treating the washed particles by contacting them with an aqueous solution of an agent selected from the group consisting of the water soluble reaction product of
    (i) an equivalent excess of an organic hydroxy acid selected from the group consisting of di- and tribasic hydroxy acids, with
    (ii) an alcohol containing from 2 to 6 hydroxyl groups; and salts thereof;
    said reaction product containing unesterfied carboxyl groups; said treating being conducted while the washed particles are in an aqueous medium; and
    washing, drying and milling the treated particles; whereby there is obtained a grade of pigment which will disperse in both aqueous and organic media.

2. A method as claimed in claim 1 wherein the surface coating also comprises one or more oxides of cerium, antimony, silicon, titanium or tin.

3. A method as claimed in claim 2 wherein the alumina and one or more oxides of other inorganic elements is present in an atomic ratio of aluminum to other elements of from 1:1 to 3:2.

4. A method as claimed in claim 1 wherein the surface coating is from 0.1% to 15% based on the dry weight of the coated pigment.

5. A method as claimed in claim 1 wherein the alumina has been precipitated onto the pigment particles at an alkaline pH.

6. A method as claimed in claim 1 wherein the alcohol contains from 4 to 6, inclusive, hydroxyl groups.

7. A method as claimed in claim 1 wherein the hydroxy acid (i) is saturated with respect to chemical bonding and has a carbon chain of from 3 to 6 carbon atoms.

8. A method as claimed in claim 7 wherein the alcohol (ii) contains from 4 to 6, inclusive, hydroxyl groups and are saturated with respect to chemical bonding.

9. A method as claimed in claim 1 wherein the contacting is carried out by adding a solution of the agent to an aqueous slurry or to an undried filtercake of the pigment particles.

10. A method as claimed in claim 1 wherein the hydroxy acids or salts thereof are selected from the group consisting of citric acid, tartaric acid, sodium and potassium salts thereof.

11. A method as claimed in claim 10 wherein the alcohol comprises pentaerythritol.

12. The product of the process of claim 1.

* * * * *